Dec. 2, 1930. E. E. OLIVER 1,783,340
GEAR DRIVE FOR CINEMATOGRAPHIC PROJECTORS
Filed July 2, 1927 2 Sheets-Sheet 1
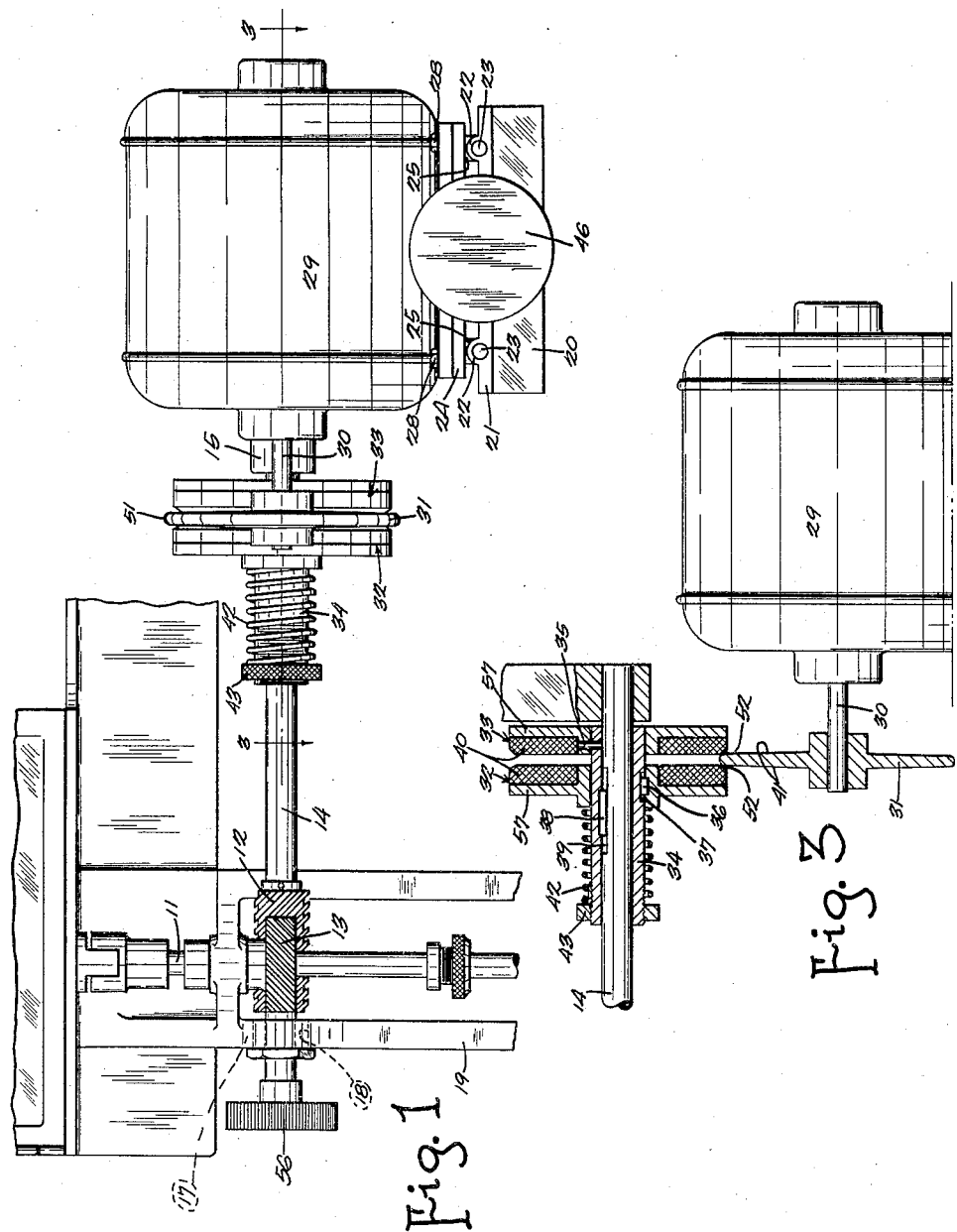
Elwyn E. Oliver
Inventor
by Smith and Freeman
Attorneys

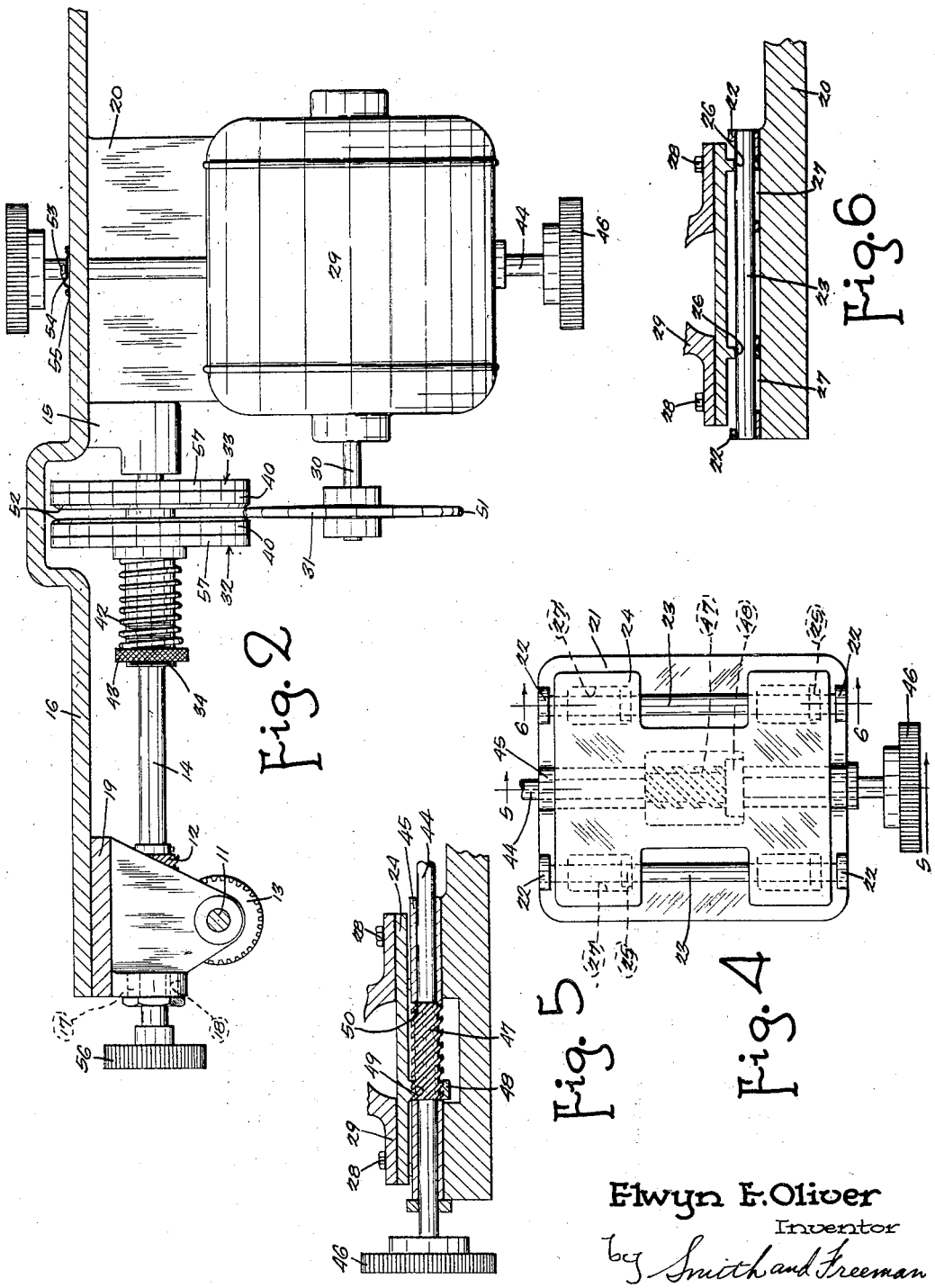

Patented Dec. 2, 1930

1,783,340

UNITED STATES PATENT OFFICE

ELWYN E. OLIVER, OF CLEVELAND, OHIO

GEAR DRIVE FOR CINEMATOGRAPHIC PROJECTORS

Application filed July 2, 1927. Serial No. 203,041.

My invention relates to cinematographic projectors, and particularly to a variable speed drive for a cinematographic projector, and the principal object of my invention is to provide a new and improved drive for this purpose. In the drawings accompanying this specification and forming a part of this application I have shown, for purposes of illustration, one form which my invention may assume, and in these drawings:

Figure 1 is a side elevation of the embodiment of my invention herein shown,

Figure 2 is a plan view of the mechanism shown in Figure 1,

Figure 3 is a fragmentary section taken on the line 3—3 of Figure 1,

Figure 4 is a plan view of the motor support,

Figure 5 is a section taken on the line 5—5 of Figure 4, while

Figure 6 is a section taken on the line 6—6 of Figure 4.

The variable speed drive herein shown is herein illustrated as operating a projector shaft 11 by means of a worm 12 meshing with a worm gear 13 carried upon the projector shaft 11, and as comprising a shaft 14 carrying the worm 12, mounted at one end in a bracket 15 projecting from a back plate 16, and mounted at the other end in a bushing 17 removably positioned within an aperture 18 formed in a plate 19 projecting from the back plate 16, and large enough to permit passage of the worm 12 therethrough thus to permit removal of the shaft 14 without disassembly of the worm 12 therefrom.

Also projecting from the back plate 16 is a bracket 20 on which is mounted a base plate 21 provided with four upstanding lugs 22 in which are supported a pair of guide rods 23 which in turn reciprocably support a motor base 24 reciprocably secured to the guide rods 23 by means of lugs 25 projecting downwardly from the motor base 24, provided with apertures 26 receiving the guide rods 23, and reciprocable, in slots 27 cut in the base plate 21, between limits fixed by the longitudinal dimensions of the slots 27.

Secured to the motor base 24 in any suitable manner, as by means of machine screws 28, is an electric motor 29 carrying on its shaft 30 a friction driving disc 31 cooperating with a pair of friction driven discs 32 and 33 mounted upon a sleeve 34 which is in turn mounted upon the shaft 14. In the embodiment of my invention herein shown the driven disc 33 is fixed to the sleeve 34 by means of a securing pin 35, the driven disc 32 is keyed to the sleeve 34 by means of a key 36 projecting from the driven disc 32 into a keyway 37 formed in the sleeve 34 and of greater length than the key 36 to permit limited reciprocation of the driven disc 32 longitudinally of the sleeve 34, the sleeve 34 is secured to the shaft 14 by means of a key 38 projecting from the sleeve 34 into a keyway 39 formed in the shaft 14 and of greater length than the key 38 to permit limited reciprocation of the sleeve 34 along the shaft 14, each of the driven discs 32 and 33 comprises a metal backing plate 57 faced by a friction plate 40, and the driving disc 31 is provided with friction faces 41 slightly tapered so that the driving disc 31 will engage the driven discs 32 and 33 substantially at the periphery of the driven discs 32 and 33 regardless of the distance to which the driving disc 31 has been inserted between the driven discs 32 and 33.

From the above description it will be understood by those skilled in the art that the motor 29 operates the projector shaft 11 by the action of the driving disc 31 upon the driven discs 32 and 33 carried by the driven shaft 14 connected to the projector shaft 11 by means of the cooperating worm and worm gear 12 and 13, and of course that the speed of rotation of the projector shaft 11 relative to the motor shaft 30 is dependent upon the distance to which the driving disc 31 has been inserted between the driven discs 32 and 33, decreasing as the driving disc 31 is further inserted, and increasing as the driving disc 31 is withdrawn. It will also be understood that the reciprocable mounting of the driven disc 32 upon the sleeve 34, and the reciprocable mounting of the sleeve 34 upon the shaft 14, permits the driven discs 32 and 33 to at all times closely engage both sides of the driving disc 31, and to engage both sides of the driving disc 31 with the same pressure, and that the reciprocable mounting of the sleeve 34 upon the shaft 14 permits the driven discs 32 and 33 to at all times center themselves relative to the driving disc 31.

It will of course be understood by those skilled in the art that the driven discs 32 and 33 ordinarily need to be urged against the driving disc 31, and that this may be accomplished in any suitable manner; herein this function is accomplished by a compression spring 42 compressed between the rear side of the driving disc 32 and a nut 43 adjustably positioned upon the front end of the sleeve 34.

Similarly, it will be understood that the motor 29 may be reciprocated in any desired manner, and it will be realized that means for reciprocating the motor 29, and for holding the motor 29 in its reciprocated position, are at least desirable. The embodiment of my invention herein shown accordingly embodies means for this purpose, these means being herein shown as comprising a shaft 44 journaled in lugs 45 upstanding from the base plate 21, operated by means of a hand wheel 46, and carrying a screw 47 adapted to cooperate with a lug 48 projecting downwardly from the motor base 24, provided with a screw threaded aperture 49 receiving the screw 47, and extending into a recess 50 formed in the base plate 21.

As a matter of fact, in the embodiment of my invention herein shown the screw 47 is formed of sufficient length to not only move the driving disc 31 between extreme positions cooperating with the driven discs 32 and 33, but is also capable of retracting the motor 29 to an extent sufficient to entirely withdraw the driving disc 31 from between the driven discs 32 and 33 to disconnect the motor 29 from the projector shaft 11. Of course under these circumstances it becomes desirable to facilitate reinsertion of the driving disc 31 into position between the driven discs 32 and 33, and accordingly in the embodiment of my invention herein shown the driving disc 31 is provided with a rounded edge 51, and the driven discs 32 and 33 are provided with beveled edges 52.

At the same time it is also desirable to prevent accidental disconnection of the driving disc 31 from the driven discs 32, and accordingly I provide on the motor adjusting shaft 44 a pin 53 positioned to reach the hump 54 of a spring detent 55 just before the driving disc 31 is completely withdrawn from between the driven discs 32 and 33, to thus indicate that the driving disc 31 has reached this position, thus to prevent accidental disengagement of the driving disc 31 from the driven discs 32 and 33, yet without preventing intentional disengagement possible by rotation of the motor reciprocating shaft 44 with a force sufficient to ride the pin 53 over the hump 54 of the detent 55.

It will of course be understood that the projector shaft 11 may be slightly rotated, particularly for film adjustment, by means of a hand wheel 56 mounted on the front end of the driven shaft 14.

From the above description it will be obvious to those skilled in the art that I have provided a new and improved variable speed drive for a cinematographic projector, and accordingly that I have accomplished at least the principal object of my invention. At the same time it will of course also be obvious to those skilled in the art that the particular embodiment of my invention herein shown and described embodies a new and improved movement for varying the ratio between the motor speed and the projector speed, and new and improved means for moving the parts to effect a change in this ratio, yet it also will be understood by those skilled in the art that the embodiment of my invention herein shown and described embodies advantages other than these, and other than any advantages specifically pointed out or suggested herein, also that the particular embodiment of my invention herein shown and described may be variously changed and modified without departing from the spirit of my invention or sacrificing the advantages thereof, and therefore it will be understood that the disclosure herein is illustrative only and that my invention is not limited thereto.

I claim:—

1. A variable speed drive for a cinematographic projector, comprising: a driven shaft, connected to said projector to operate said projector; a driving shaft, parallel to said driven shaft and movable toward and from said driven shaft; an intermediate disc, carried by one of said shafts; a sleeve, rotatable with the other of said shafts but reciprocable longitudinally thereon; and a pair of cooperating discs, rotatable with said sleeve but movable toward and from each other, and provided with inner faces adapted to cooperate with the two faces of said intermediate disc at a distance from the axis of one of said shafts variable and depending upon the then distance by which said shafts are separated.

2. A variable speed drive for a cinematographic projector, comprising: a driven shaft, connected to said projector to operate said projector; a driving shaft, parallel to said driven shaft and movable toward and from said driven shaft; an intermediate disc, carried by one of said shafts; a sleeve, rotatable with the other of said shafts but reciprocable longitudinally thereon; a pair of cooperating discs, rotatable with said sleeve but movable toward and from each other, and provided with inner faces adapted to cooperate with the two faces of said intermediate disc at a distance from the axis of one of said shafts variable and depending upon the then distance by which said shafts are separated; and spring means carried by said sleeve for urging said cooperating discs toward each other.

3. A variable speed drive for a cinematographic projector, comprising: a driven shaft, connected to said projector to operate said projector; a motor, provided with a motor shaft; a motor support, mounting said motor with said motor shaft parallel to said driven shaft, and reciprocably to effect approachment and recession of said motor shaft toward and from said driven shaft; an intermediate disc, carried by one of said shafts; a sleeve, rotatable with the other of said shafts but reciprocable longitudinally thereon; and a pair of cooperating discs, rotatable with said sleeve but movable toward and from each other, and provided with inner faces adapted to cooperate with the two faces of said intermediate disc at a variable distance from the axis of one of said shafts, or to be withdrawn from engagement with said intermediate disc, depending upon the then reciprocable position of said motor on said motor support.

4. A variable speed drive for a cinematographic projector, comprising: a driven shaft, connected to said projector to operate said projector; a motor, provided with a motor shaft; a motor support, mounting said motor with said motor shaft parallel to said driven shaft, and reciprocably to effect approachment and recession of said motor shaft toward and from said driven shaft; an intermediate disc, carried by one of said shafts; a sleeve, rotatable with the other of said shafts but reciprocable longitudinally thereon; and a pair of cooperating discs, rotatable with said sleeve but movable toward and from each other, and provided with inner faces adapted to cooperate with the two faces of said intermediate disc at a variable distance from the axis of one of said shafts, or to be withdrawn from engagement with said intermediate disc, depending upon the then reciprocable position of said motor on said motor support; the interengaging faces of said discs being formed to automatically re-engage upon corresponding reciprocation of said motor.

5. A variable speed drive for a cinematographic projector, comprising: a driven shaft, connected to said projector to operate said projector; a motor, provided with a motor shaft; a motor support, mounting said motor with said motor shaft parallel to said driven shaft, and reciprocably to effect approachment and recession of said motor shaft toward and from said driven shaft; an intermediate disc, carried by one of said shafts; a sleeve, rotatable with the other of said shafts but reciprocable longitudinally thereon; a pair of cooperating discs, rotatable with said sleeve but movable toward and from each other, and provided with inner faces adapted to cooperate with the two faces of said intermediate disc at a variable distance from the axis of one of said shafts, or to be withdrawn from engagement with said intermediate disc, depending upon the then reciprocable position of said motor on said motor support; and a spring carried by said sleeve urging said cooperating discs into engagement with said intermediate disc.

6. A variable speed drive for a cinematographic projector, comprising: a driven shaft, connected to said projector to operate said projector; a motor, provided with a motor shaft; a motor support, mounting said motor with said motor shaft parallel to said driven shaft, and reciprocably to effect approachment and recession of said motor shaft toward and from said driven shaft; an intermediate disc, carried by one of said shafts; a sleeve, rotatable with the other of said shafts but reciprocable longitudinally thereon; a pair of cooperating discs, rotatable with said sleeve but movable toward and from each other, and provided with inner faces adapted to cooperate with the two faces of said intermediate disc at a variable distance from the axis of one of said shafts, or to be withdraw from engagement with said intermediate disc, depending upon the then reciprocable position of said motor on said motor support; and a spring carried by said sleeve urging said cooperating discs into engagement with said intermediate discs; the interengaging faces of said discs being formed to automatically re-engage upon corresponding reciprocation of said motor.

In testimony whereof I hereunto affix my signature.

ELWYN E. OLIVER.